June 24, 1969   H. B. CHRISTENSEN ETAL   3,451,305
BRAIDED STEEL LEADER CONSTRUCTION Filed March 28, 1967   Sheet 1 of 2

INVENTORS
HARLAN B. CHRISTENSEN
PAUL C. JOHNSON
BY Adams, Cwayna
& Haugen   ATTORNEYS

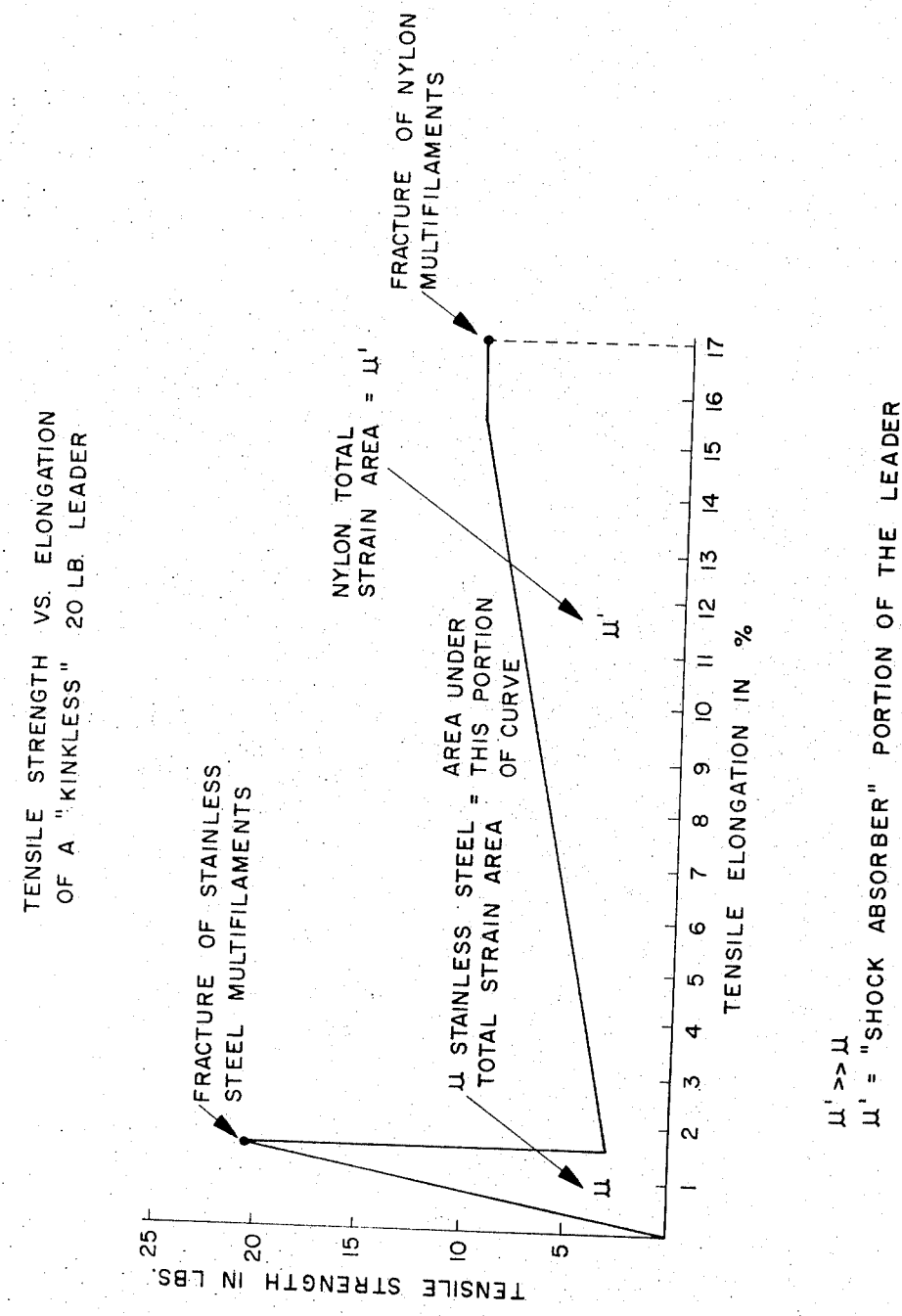

United States Patent Office 3,451,305
Patented June 24, 1969

3,451,305
BRAIDED STEEL LEADER CONSTRUCTION
Harlan B. Christensen and Paul C. Johnson, Spirit Lake, Iowa, assignors to Berkley & Company, Inc., Spirit Lake, Iowa, a corporation of Iowa
Filed Mar. 28, 1967, Ser. No. 626,624
Int. Cl. A01k 91/04
U.S. Cl. 87—6                                  7 Claims

ABSTRACT OF THE DISCLOSURE

A stranded line, more particularly stranded line adapted for use as a fishing leader and being highly flexible, resistant to kinking, and having exceptional strength qualities. The line includes a group of braided monofilament stainless steel fibers having a filament diameter of between about 10 microns and 20 microns, and may also include core materials and sheath materials, preferably nylon, having predetermined flexibility characteristics.

---

In general, the present invention relates to the preparation of lines, particularly those lines which are well adapted for use as fishing leaders. In order to achieve the desired degree of flexibility, this flexibility generally matching that flexibility now available in extruded monofilament nylon lines, braided multi-filament fibers of stainless steel having a diameter of between about 10 and 20 microns are utilized. This basic material is used in combination with core and sheath materials generally fabricated from nylon, the sheath material generally being an extruded jacket having a basic or bulk flexibility which is greater than the flexibility of the core material. While the core may be either monofilament or multi-filament, it is generally preferred, for purposes of achieving the desired flexibility, that the core material be a strand of parallelly disposed multi-filament fibers fabricated from a nylon having a basic or bulk flexibility which is generally less than that of the extruded nylon jacket. Such a match of components will provide for the desired flexibility in the line material, and will also provide for the desired strength characteristics of the composite.

In the past, stainless steel filaments of significantly large diameter have been used for fishing leaders, these stainless steel filaments being used both with and without a nylon jacket. For example, certain leader materials have been prepared utilizing twisted or braided stainless steel filaments made up into a thread-like construction, this structure being optionally coated with an extruded nylon jacket. Significant disadvantages exist in certain of these materials inasmuch as they have a tendency to kink and take a permanent set, and also, because of their lack of extreme flexibility, have a tendency to suppress the natural action of the bait as it is pulled through the water. In other words, the stiff or rigid leader member then acts as an anomalous member of a composite line structure, thus giving a false appearance and false action to the bait as it moves through the water. The advantages of currently available limp monofilament lines are that they permit the natural action of the bait to occur in the water during an ordinary fishing operation, and when stiff or rigid leader devices are used to couple a bait to the line, this advantage of the monofilament line is frequently lost. Thus, the ideal fishing leader substance is one which has sufficient rigidity and strength so as to resist being bit through by striking fish, but yet have a sufficient natural flexibility so as to reasonably match that natural flexibility of the monofilament line material. This combination of characteristics necessarily requires a high tensile strength along with a reasonably low beam stiffness, the beam stiffness preferably equalling or at least approaching that beam stiffness of the conventional monofilament fishing line.

In order to achieve this degree of flexibility without necessarily acquiring a significantly large beam stiffness, it has been determined that one may utilize a braid of stainless steel monofilaments, each monofilament having a diameter of between about 10 and 20 microns, and each filament being braided into a single large strand, or a selected number of these filaments may be braided into a strand, the strands then ultimately being braided to form a line. As a core material, it is generally preferred that multi-filament nylon be utilized as the core material, and the core material along with the stainless steel braid may be covered with an extruded sheath of nylon. In order to achieve the desired flexibility, care must be taken to assure that the extruded sheath is highly flexible, and this is achieved by utilizing a highly flexible nylon for the extruded sheath material. It will be apparent, therefore, that the sheath material has a degree of bulk flexibility which generally exceeds that bulk flexibility of the core material.

Therefore, in a composite leader, the tensile strength of the stainless steel multi-filament component will generally control or predominate in the tensile strength of the composite unit. Its strain or tensile elongation percentage is, however, relatively low, and thus its capability of withstanding shock loads is relatively modest. In the composite structure, however, the nylon multi-filament portion has a feature which permits significant tensile elongation, this elongation being consistent with its lower tensile strength characteristics. Its total strain, or tensile elongation is sufficiently large so that in the composite, it reacts to absorb a significant amount of the shock loading, and thus prevent breaking of the leader due to shock loading.

Therefore, it is an object of the present invention to provide an improved line substance which finds particular utility in the fishing leader area, this line having as its basic foundation, a braid of multi-filament stainless steel fibers, each fiber having a diameter of between about 10 and 20 microns.

It is a further object of the present invention to provide an improved fishing leader structure having a basic structure of stainless steel multi-filaments of small diameter, and being provided with core and sheath materials of nylon.

It is yet a further object of the present invention to provide an improved fishing leader which employs a composite structure including a core of nylon multi-filaments, a braid of stainless steel multi-filaments thereover, and a sheath of nylon enclosing the braid, the outer nylon sheath having a high degree of flexibility.

Other and further objects of the present invention will become apparent to those skilled in the art upon a study of the following specification, appended claims, and accompanying drawings wherein:

FIGURE 4 is a graph showing the tensile strength of the composite as a function of its tensile elongation in percent.

Figure 1:
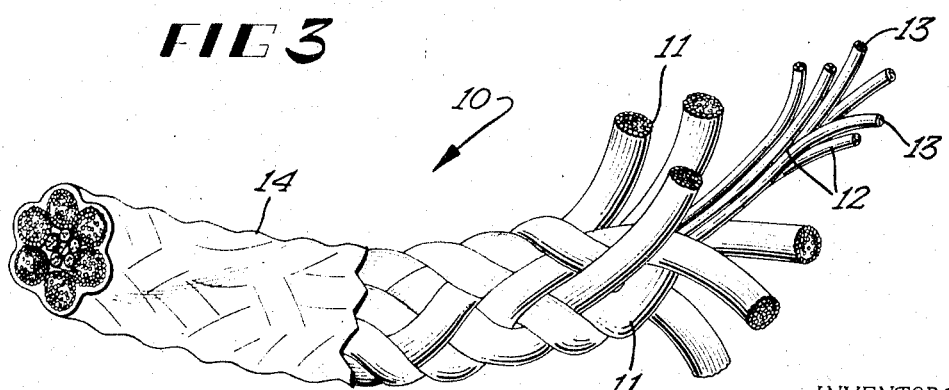
FIGURE 1 is a perspective view of a segment of line leader material, with the cross-sectional arrangement of the structure being shown, and including a central core of multi-filament nylon, a braid thereover of monofilament stainless steel fibers, and a sheath of nylon enclosing the composite structure.

In accordance with the preferred modification of the present invention, and with particular attention being directed to FIGURE 1 of the drawings, the line segment 10 includes a plurality of braided strands of monofilament stainless steel fibers 11 braided about a core 12 of nylon multi-filaments. The core 12 comprises a number of individual strands 13—13. These individual strands 13—13 of multi-filament nylon are disposed in general parallel relationship, one to another. A sheath member 14 is disposed about the composite structure as indicated, this sheath also comprising nylon.

In this structure, it is essential that the composite exhibit a high degree of limpness, that is, have a beam stiffness which approaches that of the monofilament nylon fishing lines currently available. This is best achieved by utilizing a central core of a modestly limp nylon such as, for example, Zytel 69 nylon, a braid of multi-filament stainless steel fibers of 304 type stainless steel, these fibers being prepared from filaments having a diameter of below about 20 microns, and preferably between about 10 and 20 microns. Zytel 69 is a polyamide nylon terpolymer composed of type 6, 6–10, and 6,6 which is plasticized with a diol. The outer sheath of nylon is generally thin in cross-section, a 5–10 mil skin thickness being adequate for a 20-pound test composite structure. The basic or bulk flexibility of the nylon sheath material 14 should preferably be less than that of the material utilized in fabricating the core 12. In this connection, when 6,6 nylon is being used as a core material, a more limp nylon such as Zytel 69 nylon may be utilized for the sheath material. It will be appreciated that other substances and combinations may be employed, such as a combination of type 6 nylon as a core material together with type 6,6 nylon as the sheath material. While under similar preparation procedures, those copolymeric structures having a higher molecular weight will exhibit a greater degree of flexibility than those copolymeric or polymeric structures of a lower molecular weight. Also, it is generally recognized that copolymeric nylon compositions have a greater degree of flexibility than polymeric nylon structures having molecular weights of generally similar orders of magnitude.

In order to better comprehend the present invention, the following example is felt to be pertinent:

Example I

To make a 20-pound test kink resistant leader, the following construction was used:

(a) Core fiber: stainless steel multi-filament—6 bundles of 90 filament ends each—each filament having a diameter of 12 microns. Six stations were filled on a conventional 16-station braider. A center strand of parallel nylon 6,6 multi-filament fibers was fed into the center of the braiding stainless steel. These center fibers consisted of 6 strands of 210 denier type 6,6 nylon—each filament end being 6 denier.

(b) Jacket: Zytel 69 nylon coating was applied by conventional wire coating techniques to a thickness of .010".

The sample leaders had an average test of 24 pounds in straight tensile. Beam stiffness values were measured and found to be 28,600 p.s.i. as compared to 20-pound control leaders consisting of .004" diameter stainless steel filament cores which had beam stiffness values of 193,000 p.s.i.

Figure 2:
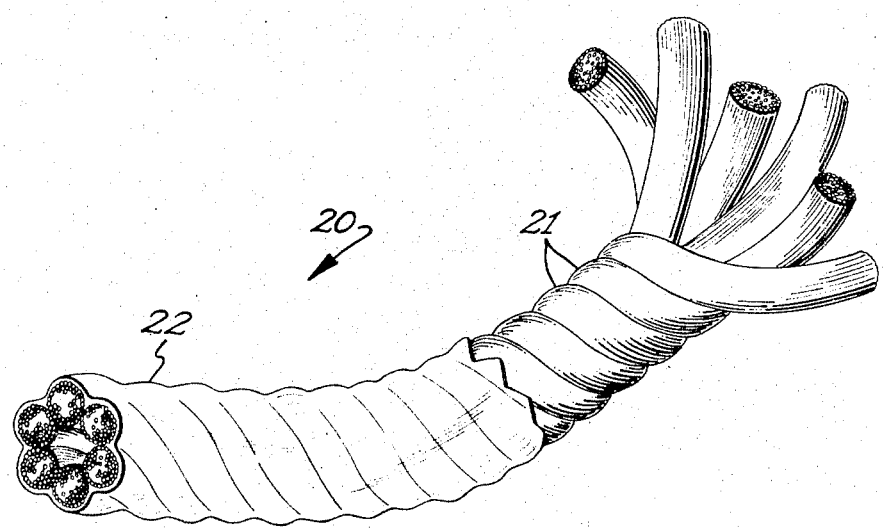
FIGURE 2 is a view similar to FIGURE 1 of a modified structure in the form of a helically wrapped strand and showing the nylon core removed.

With particular attention being directed to FIGURE 2 of the drawings, the composite line structure generally designated 20 includes a plurality of individual strands 21 of stainless steel monofilament, the strands being formed together in a helically wrapped structure as indicated. This structure is covered by a sheath 22 of nylon. With attention being directed to FIGURE 3, it will be observed that the line segment generally designated 25 includes a plurality of individual strands 26 of stainless steel monofilament fibers, these strands being braided together to form the composite structure shown. A nylon sheath 27 envelopes the braid.

Figure 3:
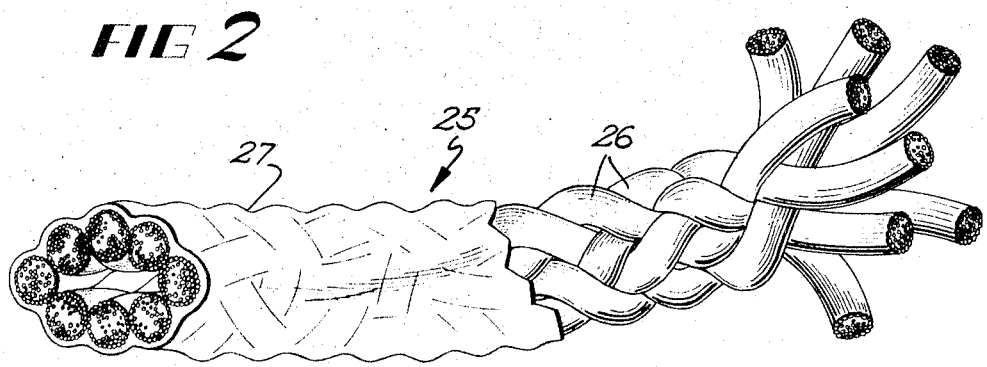
FIGURE 3 is a view similar to FIGURE 2 of a still further modified form of braid.

The following examples are provided in order to better illustrate the structure of the segments illustrated in FIGURES 2 and 3:

Example II

To make a 20-pound test kink resistant leader, the following construction was used:

(a) Core fiber: stainless steel multi-filament—6 bundles of 90 filaments each—each filament having a diameter of 12 microns. The 6 bundles are twisted on a conventional wire strander at approximately 10 twists/inch.

(b) Jacket: type 6,10 nylon coating was applied by conventional wire coating techniques to a thickness of .010".

The sample leaders had an average test of 24 pounds in straight tensile. Beam stiffness values were measured and found to be 124,700 p.s.i. as compared to 20-pound control leaders consisting of .004" diameter stainless steel filament cores which had beam stiffness values of 193,000 p.s.i.

Example III

To make a 30-pound test kink resistant leader, the following construction was used:

(a) Core fiber: stainless steel multi-filament—8 bundles of 90 filament ends of 12 microns. Eight stations were filled on a conventional 16-station braider. Each of the 8 stations contained a spool of filament end material. The filaments were braided into a flat hollow braid construction.

(b) Jacket: Zytel 69 nylon coating was applied by conventional wire coating techniques to a thickness of .010".

The sample leaders had an average test of 32 pounds in straight tensile. Beam stiffness values were measured and found to be 98,800 p.s.i. as compared to 30-pound control leaders consisting of .004" diameter stainless steel filament cores which had beam stiffness valves of 333,800 p.s.i.

With particular attention now being directed to FIGURE 4 of the drawings, it will be observed that the graph there illustrates the tensile strength in pounds versus the tensile elongation in percent for the components. The fracture point of the stainless steel multi-filaments is at the 20-pound point, this fracture point generally controlling or determining the over-all tensile strength of the composite. The fracture point of the nylon filaments is also illustrated. It will be observed that the elongation curves each define a certain area therebelow, the area covered representing the total strain area of the individual components. For the stainless steel component, this strain area is shown at $u$, and for the nylon multi-filaments, this point is shown at $u'$. Obviously, the area of $u'$ is far greater than that area of $u$, and it will be appreciated, therefore, that the function of the nylon multi-filament component is to act as a shock absorber for the composite structure. Thus, under shock loading conditions, the greater flexibility and tensile elongation characteristics of the nylon will permit the structure to resist breakage upon being subjected to sharp load conditions.

Turning now to the capability of resisting permanent "sets," it will be appreciated that as the diameter of a wire increases, the maximum fiber stress will increase proportionately at the bend area, and in certain cases the elastic limit may be exceeded. The maximum stress is always found in the outer skin area of the structure. Thus, for fine filaments, the "bend radius" is less than that for filaments of greater diameter while the over-all "bend radius" of the composite structure may be the same for both cases. Consequently, the elastic limit of the smaller diameter filaments is not exceeded, and no permanent "set" occurs. It would appear that at the vertex of the bend, there are a certain number of these filaments which, because of their location in the composite, do bend sufficiently to exceed their elastic limit, however this contribution to the entire bundle is generally negligible.

The following equation is valid for consideration of single filament concepts:

$$s = EC/\sigma$$

where $s$ = maximum bend radius of recoverable deflection
$E$ = modulus of elasticity
$C$ = distance from neutral axis to maximum fiber stress surface
$\sigma$ = maximum allowable yield stress thus, for a stainless steel filament .004″ diameter and $E = 29 \times 10^6$ $$\sigma = 200,000 \text{ p.s.i.}$$
$$s = .287″$$

for a stainless steel multi-filament .0004″ diameter and $\sigma = 200,000$ p.s.i.

$$s = .0287″$$

Thus, as the filament diameter decreases, the bend radius proportionately decreases, thus providing the availability of "set" free characteristics.

If a sheath material is provided for a filament of this type, the bend radius will be larger for certain identically applied stresses, and the availability of the cushion provided by the presence of this sheath will limit or reduce the "setting" of the filaments. It has been found that in order to eliminate the capacity of a fishing leader to take a "set" under normal handling situations, a straight ply parallel stainless steel core fiber would require a flexible sheath thereover having a skin thickness of more than 0.02 inch. This would tend to create a very large diameter leader which would be undesirable because of the preference of fishermen for leaders which are as thin as possible so as to be less apparent to the fish. This problem has been overcome, at least in part, by twisting and/or braiding the core fibers. This braiding provides an effective increase in the bend radius of the composite structure without suffering a sacrifice in the ultimate increase of the gross leader diameter.

The use of stainless steel multi-filaments having a filament diameter of less than about 20 microns, and preferably between about 10 and 20 microns, provides a beam stiffness in the braided product which is reasonably close to the beam stiffness of currently available monofilament nylon fishing lines. The number of such filaments to be braided together will, of course, be determined by the tensile strength desired in the finished product.

What is claimed is:

1. A limp fishing leader line material having a structure comprising a braid of stainless steel fibers, each fiber having a diameter of between about 10 microns and 20 microns, and being disposed about a core, the core material consisting of a plurality of flexible polymeric filaments with a diameter of between about ½ mil and 2 mils, and an outer sheath of polymeric material provided about said braid.

2. The limp fishing leader line material as defined in claim 1 being particularly characterized in that said core is nylon.

3. The limp fishing leader line material as defined in claim 2 being particularly characterized in that said core is 6,6 nylon.

4. The limp fishing leader line material as defined in claim 2 being particularly characterized in that the polymeric material of said sheath is nylon.

5. The limp fishing leader line material as defined in claim 4 being particularly characterized in that said sheath has a wall thickness of between about 5 mils and 10 mils.

6. A limp fishing leader line material having a structure comprising a braid of stainless steel fibers, each fiber having a diameter of between about 10 microns and 20 microns, said stainless steel fibers being braided upon a core of 6,6 nylon multi-filaments having a diameter of between about ½ mil and 2 mils, and an outer sheath of a terpolymer of type 6,6–10 and 6,6 nylon having a wall thickness of between about 5 mils and 10 mils about the braid, the tensile strength of the nylon core component being between about ⅓ and ⅔ of the tensile strength of the steel multi-filament component.

7. The limp fishing leader line material as defined in claim 6 being particularly characterized in that the tensile strength of the nylon core component is about ½ of the tensile strength of the steel multi-filament component.

References Cited

UNITED STATES PATENTS

| | | | |
|---|---|---|---|
| 1,950,858 | 3/1934 | Metcalf | 57—149 |
| 2,040,992 | 5/1936 | Harris. | |
| 2,894,366 | 7/1959 | Leckie | 57—149 |
| 3,067,569 | 12/1962 | Kelley | 57—144 XR |
| 3,092,685 | 6/1963 | Argento | 57—144 XR |
| 3,277,564 | 10/1966 | Webber et al. | |
| 3,288,175 | 11/1966 | Valko | 57—139 XR |

FOREIGN PATENTS 570,863  9/1958  Belgium.

OTHER REFERENCES

"Metal Fibers" (Harold H. Webber), Modern Textiles Magazine, May 1966 (pp. 72–75 relied on).

JOHN PETRAKES, Primary Examiner.

U.S. Cl. X.R.

43—44.98; 57—144; 87—7